(12) United States Patent
Hatakawa et al.

(10) Patent No.: US 8,605,805 B2
(45) Date of Patent: Dec. 10, 2013

(54) RECEIVER, CHANNEL STATE INFORMATION COMPRESSING METHOD, AND COMPUTER PROGRAM

(75) Inventors: Yasuyuki Hatakawa, Fujimino (JP); Satoshi Konishi, Fujimino (JP)

(73) Assignee: KDDI Corporation, Tokyo (JP)

( * ) Notice: Subject to any disclaimer, the term of this patent is extended or adjusted under 35 U.S.C. 154(b) by 225 days.

(21) Appl. No.: 13/226,686

(22) Filed: Sep. 7, 2011

(65) Prior Publication Data

US 2012/0063527 A1    Mar. 15, 2012

(30) Foreign Application Priority Data

Sep. 13, 2010    (JP) .................................. 2010-204524

(51) Int. Cl.
*H04K 1/10* (2006.01)
(52) U.S. Cl.
USPC ........... 375/260; 375/261; 375/267; 375/295; 375/316; 375/347
(58) Field of Classification Search
USPC ......... 375/259, 260, 261, 267, 268, 271, 295, 375/302, 316, 322, 340, 347
See application file for complete search history.

(56) References Cited

U.S. PATENT DOCUMENTS

| 8,213,368 | B2 * | 7/2012 | Hui et al. | 370/329 |
|---|---|---|---|---|
| 8,295,263 | B1 * | 10/2012 | Chen et al. | 370/345 |
| 8,315,643 | B2 * | 11/2012 | Li et al. | 455/452.2 |
| 8,385,218 | B2 * | 2/2013 | To et al. | 370/252 |
| 8,494,093 | B1 * | 7/2013 | Zhang | 375/340 |
| 2009/0147865 | A1 * | 6/2009 | Zhang et al. | 375/259 |
| 2009/0279419 | A1 * | 11/2009 | To et al. | 370/208 |
| 2010/0158146 | A1 * | 6/2010 | Hamaguchi et al. | 375/260 |
| 2010/0226269 | A1 * | 9/2010 | Chakraborty et al. | 370/252 |
| 2011/0051636 | A1 * | 3/2011 | Van Nee et al. | 370/310 |
| 2011/0134771 | A1 * | 6/2011 | Chen et al. | 370/252 |
| 2011/0159866 | A1 * | 6/2011 | Kim et al. | 455/422.1 |
| 2012/0120823 | A1 * | 5/2012 | Kotecha | 370/252 |
| 2012/0188899 | A1 * | 7/2012 | Zhang et al. | 370/252 |
| 2012/0188972 | A1 * | 7/2012 | Cheng et al. | 370/329 |
| 2013/0114461 | A1 * | 5/2013 | Seo et al. | 370/252 |

OTHER PUBLICATIONS

Vu et al., MIMO Wireless Linear Precoding, IEEE, Signal Processing Magazine, pp. 86-105, Sep. 2007.
Hatakawa et al., Performance Evaluation of the Proposed SCI Compression Scheme with Channel Estimation Error and Feedback Delay, IEICE Technical Report, RCS2009-227, pp. 115-120, Jan. 2010 (with English Abstract).

* cited by examiner

*Primary Examiner* — Hirdepal Singh
(74) *Attorney, Agent, or Firm* — Morgan, Lewis & Bockius LLP (57) ABSTRACT

A receiver receives a signal from a transmitter via communication channels, informs the transmitter of channel state information, and includes a channel correlation value computation unit that computes a correlation value assigned to each channel state information combination; a conversion input data generation unit that determines a channel state information combination having a relatively large correlation based on the correlation value, to be conversion input data; a time-to-frequency region conversion unit that converts the region of the conversion input data from a time region to a frequency region; an information compressing unit that compresses information of a frequency component included in the conversion input data obtained by the time-to-frequency region conversion unit; and a transmitting unit that sends the transmitter, information-compressed data obtained by the information compressing unit and information used for isolating the channel state information items included in the conversion input data.

9 Claims, 4 Drawing Sheets

RECEIVER, CHANNEL STATE INFORMATION COMPRESSING METHOD, AND COMPUTER PROGRAM

BACKGROUND OF THE INVENTION

1. Field of the Invention

The present invention relates to a receiver, a channel state information compressing method, and a computer program.

Priority is claimed on Japanese Patent Application No. 2010-204524, filed Sep. 13, 2010, the contents of which are incorporated herein by reference.

2. Description of the Related Art

For next-generation wireless communication systems, employment of an MIMO (multiple input multiple output) system has been examined. In the MIMO system, a transmitter performs precoding based on channel state information (CSI) which indicates the state of a signal transmission path (i.e., communication channel) for transmission data, thereby improving frequency usage efficiency in comparison with a case which does not perform such precoding (see, for example, Non-Patent Document 1).

In case of FDD (frequency division duplex), channel state information is generally acquired by a receiver. In a known method of precoding transmission data based on the channel state information, the channel state information (e.g., channel response matrix) obtained by the receiver is sent to a transmitter, and the transmitter performs precoding based on the relevant channel state information.

However, when the channel state information obtained by the receiver is directly sent to the transmitter, the amount of transmission data is massive. Therefore, as a method for reducing the amount of data sent from a receiver to a transmitter, Non-Patent Document 2 is known. In the known channel state information compressing technique disclosed in Non-Patent Document 2, channel state information is subjected to DCT (discrete cosine transform), and only data having a relatively high electric power among data after DCT is sent to the transmitter.

Non-Patent Document 1: M. Vu, A. Paulraj, "MIMO Wireless Linear Precoding", IEEE Signal Processing Magazine, pp. 86-105, September 2007.

Non-Patent Document 2: Y. Hatakawa, S. Konishi, "Performance Evaluation of the Proposed CSI Compression Scheme with Channel Estimation Error and Feedback Delay", IEICE Technical Report, RCS2009-227, pp. 115-120, January 2010

For the above-described channel state information compressing technique, improvement in the reduction efficiency for the amount of data of the channel state information (sent from the receiver to the transmitter) has been desired. When sending a signal from a transmitter to a receiver via multiple communication channels, there are channel state information items respectively corresponding to the communication channels. For such a case, in order to improve the reduction efficiency for the amount of data of the channel state information, when subjecting the channel state information items to DCT, it is important how to select each information item so as to form DCT input data for collectively performing DCT.

SUMMARY OF THE INVENTION

In light of the above circumstances, an object of the present invention is to provide a receiver, a channel state information compressing method, and a computer program, by which when a signal is sent from a transmitter to a receiver via a multiple communication channels and the receiver sends a reduced amount of data of multiple channel state information items, the reduction efficiency for the amount of relevant data can be improved.

Therefore, the present invention provides a receiver that receives a signal from a transmitter via a plurality of communication channels, informs the transmitter of channel state information which indicates a state of the communication channels, and comprises:

a channel correlation value computation unit that computes a correlation value assigned to each channel state information combination between channel state information items corresponding to the communication channels;

a conversion input data generation unit that determines a channel state information combination, which has been determined to have a relatively large correlation based on the correlation value, to be conversion input data;

a time-to-frequency region conversion unit that converts the region of the conversion input data from a time region to a frequency region;

an information compressing unit that compresses information of a frequency component included in the conversion input data obtained by the time-to-frequency region conversion unit; and a transmitting unit that sends the transmitter, information-compressed data obtained by the information compressing unit and information used for isolating the channel state information items included in the conversion input data.

In a typical example:

the receiver employs a multi-carrier transmission system; and the conversion input data generation unit generates the conversion input data by collecting channel state information combinations which are determined to have a relatively large correlation and have the same subcarrier.

In another typical example:

the receiver employs a multi-carrier transmission system; and the conversion input data generation unit generates the conversion input data by collecting channel state information combinations which are determined to have a relatively large correlation and have the same communication channel.

In a preferable example:

the receiver employs a multiple input multiple output (MIMO) system;

the channel correlation value computation unit computes the correlation value for only each combination with respect to a specific transmission antenna of the transmitter, between a channel state information item of a communication channel with a specific reception antenna and a channel state information item of a communication channel with each reception antenna other than the specific reception antenna; and.

if the conversion input data generation unit determines that correlation between the relevant communication channels is relatively large, the conversion input data generation unit collects the channel state information items, which relate to the specific transmission antenna of the transmitter, to be the conversion input data.

The present invention also provides a receiver that employs a multiple input multiple output (MIMO) system, receives a signal from a transmitter via a plurality of communication channels, informs the transmitter of channel state information which indicates a state of the communication channels, and comprises:

a conversion input data generation unit that generates, for a reception antenna combination including reception antennas arranged at intervals which are smaller than or equal to a predetermined value, conversion input data which collectively includes channel state information items with one transmission antenna of the transmitter;

a time-to-frequency region conversion unit that converts the region of the conversion input data from a time region to a frequency region;

an information compressing unit that compresses information of a frequency component included in the conversion input data obtained by the time-to-frequency region conversion unit; and a transmitting unit that sends the transmitter, information-compressed data obtained by the information compressing unit and information used for isolating the channel state information items included in the conversion input data.

The present invention also provides a channel state information compressing method used in a communication system that sends a signal from a transmitter to a receiver via a plurality of communication channels, so as to compress channel state information, which indicates a state of the communication channels, when sending the channel state information to the transmitter, the method comprising:

a channel correlation value computation step that computes a correlation value assigned to each channel state information combination between channel state information items corresponding to the communication channels;

a conversion input data generation step that determines a channel state information combination, which has been determined to have a relatively large correlation based on the correlation value, to be conversion input data;

a time-to-frequency region conversion step that converts the region of the conversion input data from a time region to a frequency region;

an information compressing step that compresses information of a frequency component included in the conversion input data obtained by the time-to-frequency region conversion step; and a transmitting step that sends the transmitter, information-compressed data obtained by the information compressing step and information used for isolating the channel state information items included in the conversion input data.

The present invention also provides a channel state information compressing method used in a wireless communication system that employs a multiple input multiple output (MIMO) system and sends a signal from a transmitter to a receiver via a plurality of communication channels, so as to compress channel state information, which indicates a state of the communication channels, when sending the channel state information to the transmitter, the method comprising:

a conversion input data generation step that generates, for a reception antenna combination including reception antennas arranged at intervals which are smaller than or equal to a predetermined value, conversion input data which collectively includes channel state information items with one transmission antenna of the transmitter;

a time-to-frequency region conversion step that converts the region of the conversion input data from a time region to a frequency region;

an information compressing step that compresses information of a frequency component included in the conversion input data obtained by the time-to-frequency region conversion step; and a transmitting step that sends the transmitter, information-compressed data obtained by the information compressing step and information used for isolating the channel state information items included in the conversion input data.

The present invention also provides a computer program used for executing a channel state information compressing operation in a communication system that sends a signal from a transmitter to a receiver via a plurality of communication channels, wherein when sending channel state information, which indicates a state of the communication channels, to the transmitter, the computer program makes a computer execute:

a channel correlation value computation step that computes a correlation value assigned to each channel state information combination between channel state information items corresponding to the communication channels;

a conversion input data generation step that determines a channel state information combination, which has been determined to have a relatively large correlation based on the correlation value, to be conversion input data;

a time-to-frequency region conversion step that converts the region of the conversion input data from a time region to a frequency region;

an information compressing step that compresses information of a frequency component included in the conversion input data obtained by the time-to-frequency region conversion step; and a transmitting step that sends the transmitter, information-compressed data obtained by the information compressing step and information used for isolating the channel state information items included in the conversion input data.

By using such a computer program, the corresponding receiver described above can be implemented using a computer.

The present invention also provides a computer program used for executing a channel state information compressing operation in a wireless communication system that employs a multiple input multiple output (MIMO) system and sends a signal from a transmitter to a receiver via a plurality of communication channels, wherein when sending channel state information, which indicates a state of the communication channels, to the transmitter, the computer program makes a computer execute:

a conversion input data generation step that generates, for a reception antenna combination including reception antennas arranged at intervals which are smaller than or equal to a predetermined value, conversion input data which collectively includes channel state information items with one transmission antenna of the transmitter;

a time-to-frequency region conversion step that converts the region of the conversion input data from a time region to a frequency region;

an information compressing step that compresses information of a frequency component included in the conversion input data obtained by the time-to-frequency region conversion step; and a transmitting step that sends the transmitter, information-compressed data obtained by the information compressing step and information used for isolating the channel state information items included in the conversion input data.

By using such a computer program, the corresponding receiver described above can be implemented using a computer.

In accordance with the present invention, when a signal is sent from a transmitter to a receiver via multiple communication channels and the receiver sends a reduced amount of data of multiple channel state information items, the reduction efficiency for the amount of relevant data can be improved.

DETAILED DESCRIPTION OF THE INVENTION

Hereinafter, embodiments of the present invention will be described with reference to the appended figures.

Figure 1:
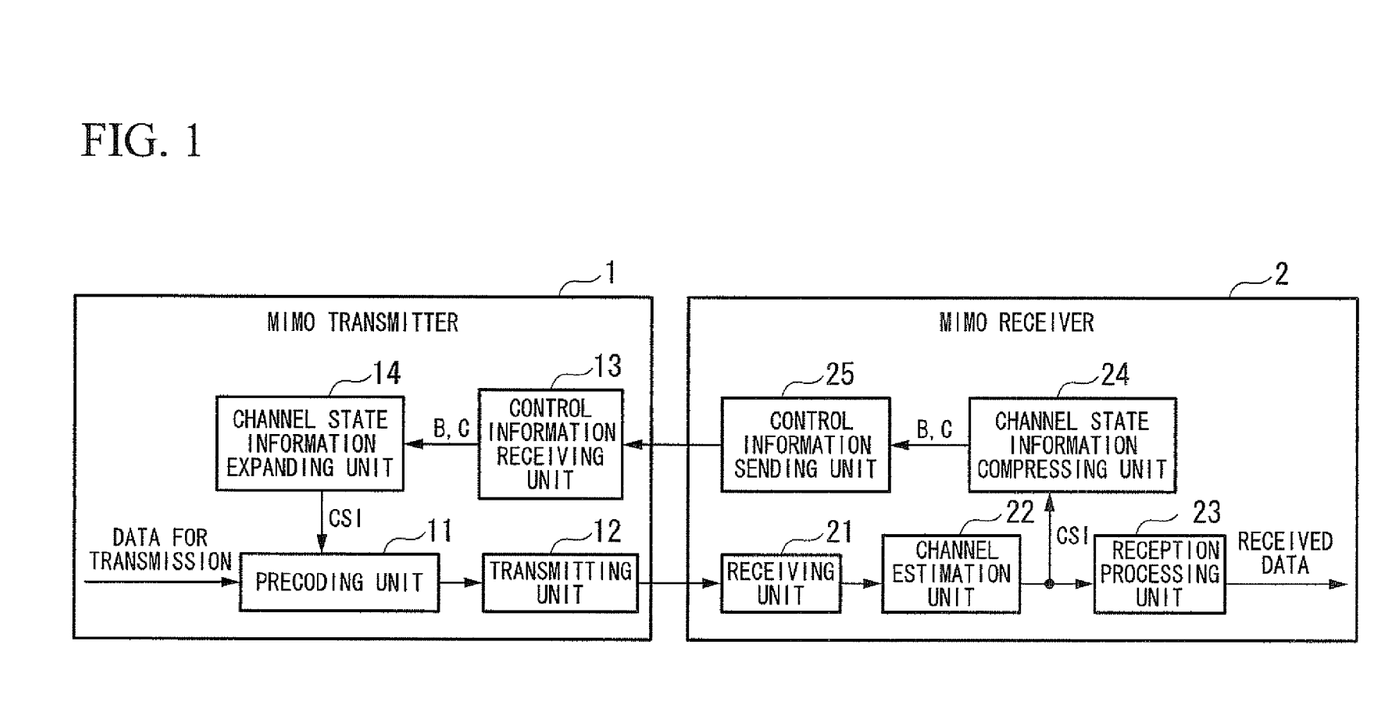
FIG. 1 is a block diagram showing the general structure of a wireless communication system relating to an embodiment of the present invention.

FIG. 1 is a block diagram showing the general structure of a wireless communication system relating to an embodiment of the present invention. The wireless communication system has a MIMO transmitter 1 and a MIMO receiver 2, where MIMO transmission is performed from the MIMO transmitter 1 to the MIMO receiver 2.

In FIG. 1, the MIMO transmitter 1 has a precoding unit 11, a transmitting unit 12, a control information receiving unit 13, and a channel state information expanding unit 14.

The precoding unit 11 performs precoding of data to be transmitted, by using channel state information (CSI). The transmitting unit 12 has a plurality of transmission antennas, and sends preceded data via the transmission antennas. The control information receiving unit 13 receives control information from the MIMO receiver 2, where the control information has channel state information compression encoded data B and control data C. The channel state information expanding unit 14 obtains channel state information by using the channel state information compression encoded data B and the control data C, and supplies the obtained channel state information to the precoding unit 11.

The MIMO receiver 2 has a receiving unit 21, a channel estimation unit 22, a reception processing unit 23, a channel state information compressing unit 24, and a control infatuation sending unit 25.

The receiving unit 21 has a plurality of reception antennas, and receives signals transmitted through the transmission the antennas of the MIMO transmitter 1. The channel estimation unit 22 estimates the channel state information (CSI) by using the signals received by the reception antennas. The reception processing unit 23 performs a reception process using the channel state information, thereby obtaining received data. The channel state information compressing unit 24 generates the channel state information compression encoded data B by using the channel state information estimated by the channel estimation unit 22, and outputs the channel state information compression encoded data B and the control data C to the control information sending unit 25. The control information sending unit 25 sends the channel state information compression encoded data B and the control data C to the MIMO transmitter 1.

Figure 2:
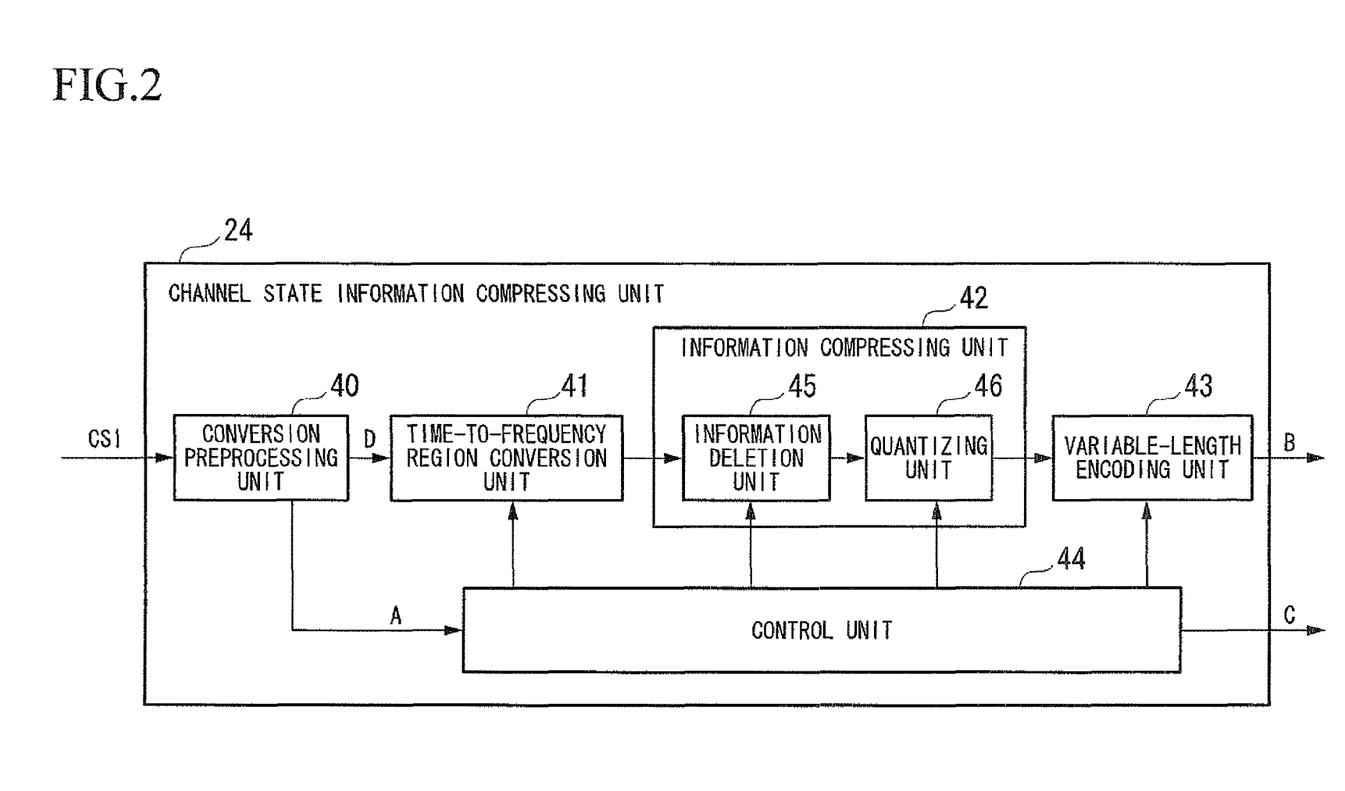
FIG. 2 is a block diagram showing the structure of the channel state information compressing unit 24 in FIG. 1.
Figure 3:
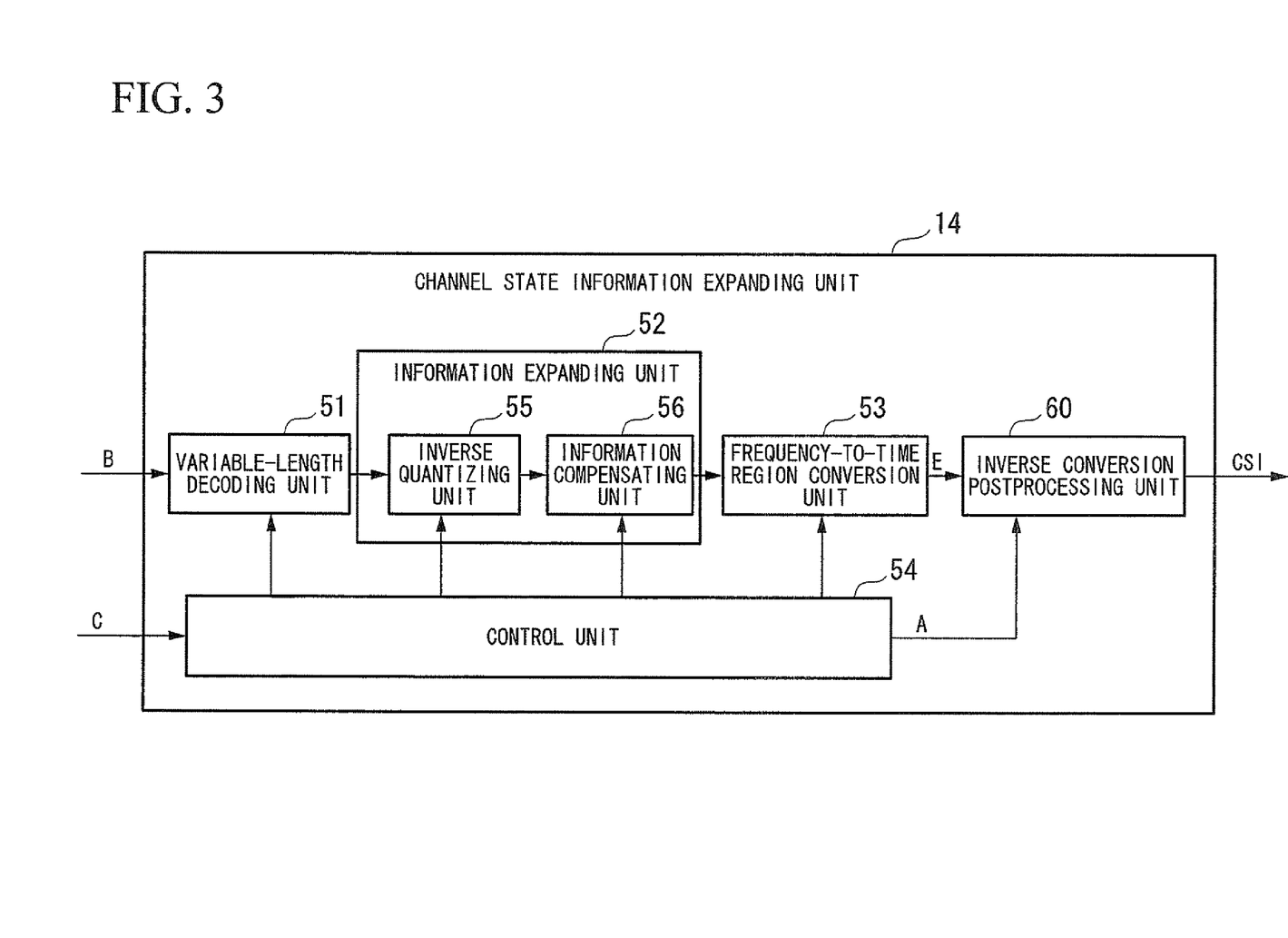
FIG. 3 is a block diagram showing the structure of the channel state information expanding unit 14 in FIG. 1.

FIG. 2 is a block diagram showing the structure of the channel state information compressing unit 24 in FIG. 1. FIG. 3 is a block diagram showing the structure of the channel state information expanding unit 14 in FIG. 1.

Referring to FIG. 2, the channel state information compressing unit 24 will be explained below. In FIG. 2, the channel state information compressing unit 24 has a conversion preprocessing unit 40, a time-to-frequency region conversion unit 41, an information compressing unit 42, a variable-length encoding unit 43, and a control unit 44. The information compressing unit 42 includes an information deletion unit 45 and a quantizing unit 46.

The conversion preprocessing unit 40 receives channel state information (CSI) from the channel estimation unit 22, and generates conversion input data D based on the channel state information. The conversion preprocessing unit 40 outputs the conversion input data D to the time-to-frequency region conversion unit 41, and also outputs isolation control information A used for isolating the channel state information contained in the conversion input data D, to the control unit 44.

The time-to-frequency region conversion unit 41 conversion the region of the conversion input data D from time to frequency. The conversion input data D consists of channel state information items to be collectively subjected to the time-to-frequency region conversion. The time-to-frequency region conversion unit 41 outputs conversion output data, which is a result of the time-to-frequency region conversion of the conversion input data D, to the information compressing unit 42.

The time-to-frequency region conversion for converting a signal in time region to a signal in frequency region may be discrete cosine transform (DCT), discrete Fourier transform (DFT), or discrete wavelet transform (DWT).

The information compressing unit 42 compresses the frequency component information included in the conversion output data, that is, reduces the number of bits of the information or partially deletes the information. The information compressing unit 42 performs the information compression of the conversion output data by using the information deletion unit 45 and the quantizing unit 46. As a method for compressing information in the frequency region, high-frequency components in the relevant information may be compressed, or frequency components having a relatively low electric power may be compressed.

The information compressing unit 42 outputs information compressed data, which is a result of the information compression of the conversion output data, to the variable-length encoding unit 43. The variable-length encoding unit 43 subjects the information compressed data received from the information compressing unit 42 to variable-length encoding, and outputs channel state information compression encoded data B, which is obtained by the variable-length encoding, to the control information sending unit 25.

The control unit 44 receives the isolation control information A from the conversion preprocessing unit 40, and controls operations of the time-to-frequency region conversion unit 41, the information compressing unit 42, and the variable-length encoding unit 43. The control unit 44 outputs control data C relating to the channel state information compression encoded data B to the control information sending unit 25, where the control data C includes the isolation control information A.

Next, referring to FIG. 3, the channel state information expanding unit 14 will be explained. In FIG. 3, the channel state information expanding unit 14 has a variable-length decoding unit 51, an information expanding unit 52, an frequency-to-time region conversion unit 53, a control unit 54, and an inverse conversion postprocessing unit 60. The information expanding unit 52 includes an inverse quantizing unit 55 and an information compensating unit 56. The structural elements in FIG. 3 respectively correspond to those shown in FIG. 2.

The variable-length decoding unit 51 receives the channel state information compression encoded data B from the control information receiving unit 13, and subjects the channel state information compression encoded data B to variable-length decoding. The variable-length decoding unit 51 outputs compressed data obtained by the variable-length decoding to the information expanding unit 52.

The information expanding unit 52 subjects the information compressed data received from the variable-length decoding unit 51 to information expansion, which is performed by the inverse quantizing unit 55 and the information compensating unit 56 in the information expanding unit 52. The information expanding unit 52 outputs data obtained by the information expansion of the information compressed data to the frequency-to-time region conversion unit 53.

The frequency-to-time region conversion unit 53 subjects the data input from the information expanding unit 52 to frequency-to-time region conversion (i.e., inverse conversion of the conversion executed by the time-to-frequency region conversion unit 41) for converting the region of the data from frequency to time. The frequency-to-time region conversion unit 53 outputs inverse conversion output data E, which is obtained by the frequency-to-time region conversion, to the inverse conversion postprocessing unit 60.

The control unit 54 receives the control data C from the control information receiving unit 13, and controls the operations of the variable-length decoding unit 51, the information expanding unit 52, and the frequency-to-time region conversion unit 53. In addition, the control unit 54 outputs the isolation control information A, which is included in the control data C, to the inverse conversion postprocessing unit 60.

Based on the isolation control information A, the inverse conversion postprocessing unit 60 isolates channel state information from the inverse conversion output data E, and outputs the channel state information (CSI) to the preceding unit 11.

Below, the conversion preprocessing unit 40 in the channel state information compressing unit 24 will be further explained by showing specific examples.

First Specific Example

Figure 4:
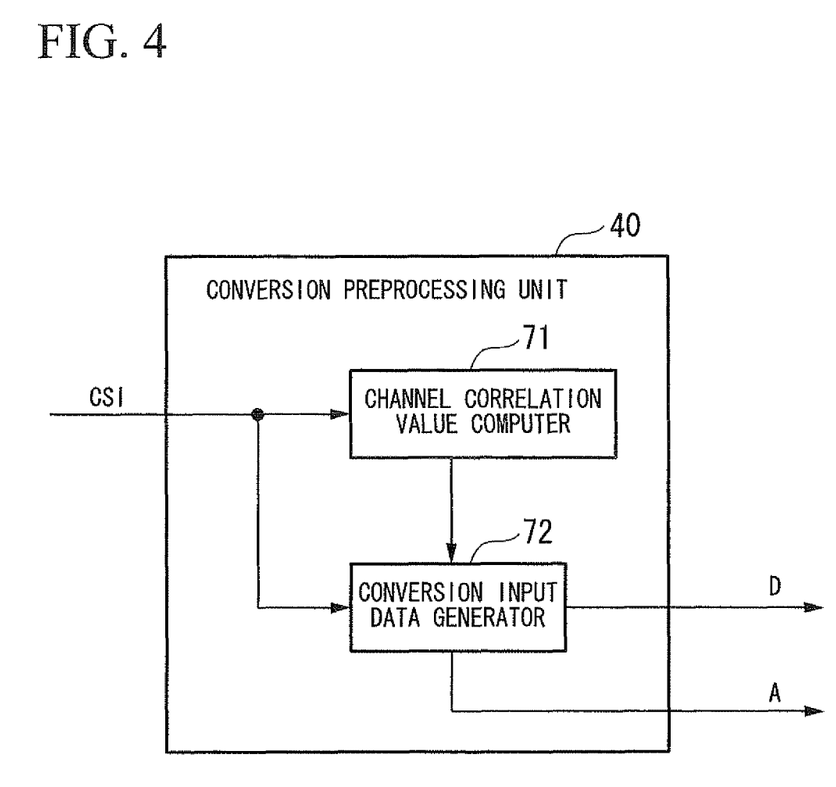
FIG. 4 shows a first specific example of the conversion preprocessing unit 40 relating to the present invention.

FIG. 4 shows a first specific example of the conversion preprocessing unit 40 of the present embodiment. In FIG. 4, the conversion preprocessing unit 40 has a channel correlation value computer 71 and a conversion input data generator 72.

The channel correlation value computer 71 computes a correlation value for each combination between channel state information (CSI) items corresponding to multiple communication channels.

When it is determined that a CSI combination has a relatively large correlation based on each correlation value obtained by the channel correlation value computer 71, the conversion input data generator 72 determines the combination to the CSI combination to be the conversion input data D. In addition, the conversion input data generator 72 generates the isolation control information A used for isolating the channel state information included in the conversion input data D.

Below, a concrete example will be shown so as to explain the operations executed by the channel correlation value computer 71 and the conversion input data generator 72.

Formula (1) shows an example of channel response matrix $H^{(t, n)}$ as channel state information. The channel response matrix $H^{(t, n)}$ in Formula (1) corresponds to a case in which the MIMO transmitter 1 has four transmission antennas, and the MIMO receiver 2 has four reception antennas. Additionally, the channel response matrix $H^{(t, n)}$ in Formula (1) is based on a multi-carrier transmission system which may be an OFDM (orthogonal frequency division multiplexing) system.

Therefore, the channel response matrix $H^{(t, n)}$ in Formula (1) corresponds the MIMO transmission system and the multi-carrier transmission system, which are collectively called a "multi-carrier MIMO system". In the multi-carrier MIMO system, for each subcarrier, a communication channel is assigned to each combination between the four transmission antennas and the four reception antennas, that is, 16 communication channels are formed in correspondence to 16 combinations between the four transmission antennas and the four reception antennas. For each subcarrier, the channel response matrix $H^{(t, n)}$ in Formula (1) contains channel state information items corresponding to the 16 communication channels.

$$H^{(t,n)} = \begin{bmatrix} h_{1,1}^{(t,n)} & h_{2,1}^{(t,n)} & h_{3,1}^{(t,n)} & h_{4,1}^{(t,n)} \\ h_{1,2}^{(t,n)} & h_{2,2}^{(t,n)} & h_{3,2}^{(t,n)} & h_{4,2}^{(t,n)} \\ h_{1,3}^{(t,n)} & h_{2,3}^{(t,n)} & h_{3,3}^{(t,n)} & h_{4,3}^{(t,n)} \\ h_{1,4}^{(t,n)} & h_{2,4}^{(t,n)} & h_{3,4}^{(t,n)} & h_{4,4}^{(t,n)} \end{bmatrix} \quad (1)$$

where $H^{(t, n)}$ is a channel response matrix for n-th subcarrier at time t; $h_{m_T, m_R}^{(t,n)}$ is channel state information which indicates a frequency response of the communication channel corresponding to the combination between the $m_T$-th transmission antenna and the $m_R$-th reception antenna for the n-th subcarrier at time t; n is a natural number from 1 to $N_{max}$ which is the number of subcarriers; and each of T and R are one of 1, 2, 3, and 4.

When receiving the channel response matrix $H^{(t, n)}$, the channel correlation value computer 71 computes a correlation value for each combination between the channel state information items $h_{m_T, m_R}^{(t,n)}$ by using a formula as shown in Formula (2). The channel correlation value computer 71 outputs the correlation values as the computation result to the conversion input data generator 72.

$$r_{m_{T1} \to m_{R1}, m_{T2} \to m_{R2}}^{(t,n)} = \frac{re(h_{m_{T1}, m_{R1}}^{(t,n)} h_{m_{T2}, m_{R2}}^{(t,n)\dagger})}{|h_{m_{T1}, m_{R1}}^{(t,n)}||h_{m_{T2}, m_{R2}}^{(t,n)}|} \quad (2)$$

where $r_{m_{T1} \to m_{R1}, m_{T2} \to m_{R2}}^{(t,n)}$ is a correlation value between channel state information $h_{m_{T1}, m_{R1}}^{(t,n)}$ assigned to the combination between the $m_{T1}$-th transmission antenna and the $m_{R1}$-th reception antenna and channel state information $h_{m_{T2}, m_{R2}}^{(t,n)}$ assigned to the combination between the $m_{T2}$-th transmission antenna and the $m_{R2}$-th reception antenna, for the n-th subcarrier at time t; re(x) indicates the real part of x; |x| indicates the absolute value of x; and † indicates a complex conjugate.

When receiving the correlation value $r_{m_{T1} \to m_{R1}, m_{T2} \to m_{R2}}$ from the channel correlation value computer 71, the conversion input data generator 72 compares it with a predetermined reference value. It can be determined that the channel state information combination "$h_{m_{T1}, m_{R1}}^{(t,n)}, h_{m_{T2}, m_{R2}}^{(t,n)}$" which has a correlation value $r_{m_{R1} \to m_{R1}, m_{T2} \to m_{R2}}$ larger than the reference value has a relatively large correlation.

If the comparison between the correlation value $r_{m_{T1} \to m_{R1}, m_{T2} \to m_{R2}}^{(t,n)}$ and the reference value is performed for each subcarrier, it is determined whether the correlation of the channel state information combination "$h_{m_{T1}, m_{R1}}^{(t,n)}, h_{m_{T2}, m_{R2}}^{(t,n)}$" it is relatively large or small in accordance with the number of the correlation values which are larger than the reference value. In another example, an average between the correlation values $r_{m_{T1} \to m_{R1}, m_{T2} \to m_{R2}}^{(t,n)}$ of all subcarriers may be compared with a reference value, and it may be determined that the correlation of the channel state information combination "$h_{m_{T1}, m_{R1}}^{(t,n)}, h_{m_{T2}, m_{R2}}^{(t,n)}$" is large when the average is larger than the reference value. In another example, only the correlation value $r_{m_{T1} \to m_{R1}, m_{T2} \to m_{R2}}^{(t,n)}$ of a specific subcarrier may be compared with a reference value, and it may be determined that the correlation of the channel state information combination "$h_{m_{T1},m_{R1}}^{(t,n)}, h_{m_{T2},m_{R2}}^{(t,n)}$" is large when correlation value is larger than the reference value.

As shown by Formula (3), the conversion input data generator 72 defines the channel state information combination "$h_{m_{T1},m_{R1}}^{(t,n)}, h_{m_{T2},m_{R2}}^{(t,n)}$", which has the correlation value $r_{m_{T1} \to m_{R1}, m_{T2} \to m_{R2}}^{(t,n)}$ that has been determined to be relatively large, to be the conversion input data D.

$$\left[ h_{1,1}^{(1,1)}, h_{1,2}^{(1,1)}, h_{1,1}^{(1,2)}, h_{1,2}^{(1,2)}, h_{1,1}^{(1,3)}, h_{1,2}^{(1,3)}, \ldots, h_{1,1}^{(1,N_{DFT})}, h_{1,2}^{(1,N_{DFT})} \right] \quad (3)$$

In contrast, for each channel state information combination "$h_{m_{T1},m_{R1}}^{(t,n)}, h_{m_{T2},m_{R2}}^{(t,n)}$" which has the correlation value $r_{m_{T1} \to m_{R1}, m_{T2} \to m_{R2}}^{(t,n)}$ that has been determined not to be relatively large, the conversion input data generator 72 defines each of the channel state information items $h_{m_{T1},m_{R1}}^{(t,n)}$ and $h_{m_{T2},m_{R2}}^{(t,n)}$ to be the independent conversion input data D, as shown in Formulas (4) and (5).

$$\left[ h_{1,m_R}^{(1,1)}, h_{1,m_R}^{(1,2)}, h_{1,m_R}^{(1,3)}, \ldots, h_{1,m_R}^{(1,N_{DFT})} \right] \quad (4)$$

where $m_R$ is 3 or 4.

$$\left[ h_{m_T,m_R}^{(1,1)}, h_{m_T,m_R}^{(1,2)}, h_{m_T,m_R}^{(1,3)}, \ldots, h_{m_T,m_R}^{(1,N_{DFT})} \right] \quad (5)$$

where $m_T$ is 2, 3, or 4, and $m_R$ is 1, 2, 3, or 4.

In the above case employing Formulas (3) to (5), only the channel state information combination "$h_{1,1}^{(t,n)}, h_{1,2}^{(t,n)}$" relating to "$(m_{T1}, m_{R1})=(1, 1)$ and $(m_{T2}, m_{R2})=(1, 2)$" is determined to have a large correlation. In addition, the time-to-frequency region conversion unit 41 has a discrete Fourier transformer (DFT), where the number of points for DFT is indicated by $N_{DFT}$. Additionally, the number $N_{max}$ of subcarriers coincides with the $N_{DFT}$ number of points.

In the example employing Formulas (3) to (5), 15 conversion input data items D are totally formed, which include one conversion input data D according to Formula (3); two conversion input data items D according to Formula (4); and twelve conversion input data items D according to Formula (5). The time-to-frequency region conversion unit 41 individually subjects each of the fifteen conversion input data items D to DFT.

Additionally, for each of the fifteen conversion input data items D, the conversion input data generator 72 generates the isolation control information A for isolating the channel state information included in the relevant conversion input data D. For example, for every channel state information item included in the first conversion input data D, a combination of an identifier for the relevant channel state information and a DFT input terminal number is contained in the first isolation control information A.

In accordance with the first specific example, a combination of the channel state information items, which has been determined to have a relatively large correlation value, is collectively subjected to the time-to-frequency region conversion, and information of the frequency component included in the relevant conversion output data is compressed. Accordingly, efficiency for reduction in the amount of data for the channel state information can be improved.

In Formula (3), the conversion input data is generated employing the channel state information combination "$h_{1,1}^{(t,n)}, h_{1,2}^{(t,n)}$", which has a correlation value that has been determined to be relatively large, in a manner such that information items belonging to the same subcarrier are collected. In contrast, as shown in FIG. 6, the conversion input data may be generated employing the channel state information combination "$h_{1,1}^{(t,n)}, h_{1,2}^{(t,n)}$", which has a correlation value that has been determined to be relatively large, in a manner such that information items belonging to the same communication channel are collected.

$$\left[ h_{1,1}^{(1,1)}, h_{1,1}^{(1,2)}, h_{1,1}^{(1,3)}, \ldots, h_{1,1}^{(1,N_{DFT})}, h_{1,2}^{(1,1)}, h_{1,2}^{(1,2)}, h_{1,2}^{(1,3)}, \ldots, h_{1,2}^{(1,N_{DFT})} \right] \quad (6)$$

In addition, the time-to-frequency region conversion unit 41 has two DFTs, each having a number $N_{DFT}$ of DFT points, so as to divide the conversion input data D (whose number of elements is as twice as $N_{DFT}$) into halves which are respectively converted by the two DFTs. As an alternative, a DFT having a number of points which is as twice as $N_{DFT}$ may be employed, so that the conversion input data D (whose number of elements is as twice as $N_{DFT}$) according to Formula (3) can be converted all together.

Second Specific Example

As a variation of the first specific example, a second specific example will be shown. The conversion preprocessing unit 40 for the second specific example also has a structure as shown in FIG. 4. In the second specific example, the amount of correlation value computation for each combination of the channel state infatuation is reduced.

In the first specific example, the channel correlation value computer 71 uses Formula (2) so as to compute a correlation value for every combination for the channel state information $h_{m_T,m_R}^{(t,n)}$. In contrast, in the second specific example, the channel correlation value computer 71 computes the correlation value for only each combination with respect to a specific transmission antenna of the MIMO transmitter 1, between channel state information of a communication channel with a specific reception antenna and channel state information of a communication channel with each reception antenna other than the specific reception antenna, as shown by Formula (7).

$$\frac{1}{3} \sum_{m_{R2}=2}^{4} r_{1 \to 1, 1 \to m_{R2}}^{(t,n)} \quad (7)$$

In the example of Formula (7), for the channel response matrix $H^{(t,n)}$ in Formula (1), the correlation value is computed for only each combination with respect to the first transmission antenna ($m_{T1}=m_{T2}=1$), between channel state information $h_{1,1}^{(t,n)}$ of the communication channel with the first reception antenna ($m_{R1}=1$) and the channel state information items $h_{1,2}^{(t,n)}$, $h_{1,3}^{(t,n)}$, and $h_{1,4}^{(t,n)}$ of the communication channel with each of the second, third and fourth reception antennas ($m_{R2}=2, 3, 4$).

If it is determined that correlation between the relevant communication channels is relatively large based on the correlation values, the conversion input data generator 72 generates conversion input data by collecting channel state information items corresponding to one antenna in the MIMO transmitter 1, as shown by Formulas (8) to (11).

$$[h_{1,1}^{(1,1)}, h_{1,2}^{(1,1)}, h_{1,3}^{(1,1)}, h_{1,4}^{(1,1)}, h_{1,1}^{(1,2)}, h_{1,2}^{(1,2)}, \ldots , \\ h_{1,1}^{(1,N_{DFT})}, h_{1,2}^{(1,N_{DFT})}, h_{1,3}^{(1,N_{DFT})}, h_{1,4}^{(1,N_{DFT})}] \quad (8)$$

$$[h_{2,1}^{(1,1)}, h_{2,2}^{(1,1)}, h_{2,3}^{(1,1)}, h_{2,4}^{(1,1)}, h_{2,1}^{(1,2)}, h_{2,2}^{(1,2)}, \ldots , \\ h_{2,1}^{(1,N_{DFT})}, h_{2,2}^{(1,N_{DFT})}, h_{2,3}^{(1,N_{DFT})}, h_{2,4}^{(1,N_{DFT})}] \quad (9)$$

$$[h_{3,1}^{(1,1)}, h_{3,2}^{(1,1)}, h_{3,3}^{(1,1)}, h_{3,4}^{(1,1)}, h_{3,1}^{(1,2)}, h_{3,2}^{(1,2)}, \ldots , \\ h_{3,1}^{(1,N_{DFT})}, h_{3,2}^{(1,N_{DFT})}, h_{3,3}^{(1,N_{DFT})}, h_{3,4}^{(1,N_{DFT})}] \quad (10)$$

$$[h_{4,1}^{(1,1)}, h_{4,2}^{(1,1)}, h_{4,3}^{(1,1)}, h_{4,4}^{(1,1)}, h_{4,1}^{(1,2)}, h_{4,2}^{(1,2)}, \ldots , \\ h_{4,1}^{(1,N_{DFT})}, h_{4,2}^{(1,N_{DFT})}, h_{4,3}^{(1,N_{DFT})}, h_{4,4}^{(1,N_{DFT})}] \quad (11)$$

$$[h_{1,1}^{(1,1)}, h_{1,2}^{(1,1)}, h_{1,3}^{(1,1)}, h_{1,4}^{(1,1)}, h_{1,1}^{(1,2)}, h_{1,2}^{(1,2)}, \ldots , \\ h_{1,1}^{(1,N_{DFT})}, h_{1,2}^{(1,N_{DFT})}, h_{1,3}^{(1,N_{DFT})}, h_{1,4}^{(1,N_{DFT})}] \quad (12)$$

$$[h_{2,1}^{(1,1)}, h_{2,2}^{(1,1)}, h_{2,3}^{(1,1)}, h_{2,4}^{(1,1)}, h_{2,1}^{(1,2)}, h_{2,2}^{(1,2)}, \ldots , \\ h_{2,1}^{(1,N_{DFT})}, h_{2,2}^{(1,N_{DFT})}, h_{2,3}^{(1,N_{DFT})}, h_{2,4}^{(1,N_{DFT})}] \quad (13)$$

$$[h_{3,1}^{(1,1)}, h_{3,2}^{(1,1)}, h_{3,3}^{(1,1)}, h_{3,4}^{(1,1)}, h_{3,1}^{(1,2)}, h_{3,2}^{(1,2)}, \ldots , \\ h_{3,1}^{(1,N_{DFT})}, h_{3,2}^{(1,N_{DFT})}, h_{3,3}^{(1,N_{DFT})}, h_{3,4}^{(1,N_{DFT})}] \quad (14)$$

$$[h_{4,1}^{(1,1)}, h_{4,2}^{(1,1)}, h_{4,3}^{(1,1)}, h_{4,4}^{(1,1)}, h_{4,1}^{(1,2)}, h_{4,2}^{(1,2)}, \ldots , \\ h_{4,1}^{(1,N_{DFT})}, h_{4,2}^{(1,N_{DFT})}, h_{4,3}^{(1,N_{DFT})}, h_{4,4}^{(1,N_{DFT})}] \quad (15)$$

In the example of Formulas (8) to (11), the result of computation by Formula (7) is larger than a predetermined reference value. For Formula (8), the channel state information items $h_{1,1}^{(t,n)}$, $h_{1,2}^{(t,n)}$, $h_{1,3}^{(t,n)}$, and $h_{1,4}^{(t,n)}$ relating to the first transmission antenna ($m_T=1$) are collectively contained in conversion input data D. For Formula (9), the channel state information items $h_{2,1}^{(t,n)}$, $h_{2,2}^{(t,n)}$, $h_{2,3}^{(t,n)}$, and $h_{2,4}^{(t,n)}$ relating to the second transmission antenna ($m_T=2$) are collectively contained in conversion input data D. For Formula (10), the channel state information items $h_{3,1}^{(t,n)}$, $h_{3,2}^{(t,n)}$, $h_{3,3}^{(t,n)}$, and $h_{3,4}^{(t,n)}$ relating to the third transmission antenna ($m_T=3$) are collectively contained in conversion input data D. For Formula (11), the channel state information items $h_{4,1}^{(t,n)}$, $h_{4,2}^{(t,n)}$, $h_{4,3}^{(t,n)}$, and $h_{4,4}^{(t,n)}$ relating to the fourth transmission antenna ($m_T=4$) are collectively contained in conversion input data D.

If the result of computation by Formula (7) is smaller than or equal to the predetermined reference value, a process similar to the first specific example is performed. That is, a correlation value is computed for every combination between the channel state information items $h_{M_T,m_R}^{(t,n)}$, and it is determined whether or not the correlation of each channel state information combination is large.

In accordance with the second specific example, the amount of correlation value computation for the channel state information combinations can be reduced.

Third Specific Example

In a third specific example, no correlation value is computed for the channel state information combinations. Therefore, the conversion preprocessing unit 40 of the third specific example has no channel correlation value computer 71 in FIG. 4.

In the third specific example, for a reception antenna combination including reception antennas arranged at intervals which are smaller than or equal to a predetermined value, the conversion input data generator 72 generates conversion input data which collectively includes channel state information items for one transmission antenna of the MIMO transmitter 1, as shown by Formulas (12) to (15). This is because it can be anticipated that for such a reception antenna combination including reception antennas arranged at intervals which are smaller than or equal to a predetermined value, the correlation value for each relevant channel state information combination is relatively large.

In the example of Formulas (12) to (15), each interval between four reception antennas ($m_R=1, 2, 3, 4$) is smaller than or equal to a predetermined value. For Formula (12), the channel state information items $h_{1,1}^{(t,n)}$, $h_{1,2}^{(t,n)}$, $h_{1,3}^{(t,n)}$, and $h_{1,4}^{(t,n)}$ relating to the first transmission antenna ($m_T=1$) are collectively contained in conversion input data D. For Formula (13), the channel state information items gin), $h_{2,1}^{(t,n)}$, $h_{2,2}^{(t,n)}$, $h_{2,3}^{(t,n)}$, and $h_{2,4}^{(t,n)}$ relating to the second transmission antenna ($m_T=2$) are collectively contained in conversion input data D. For Formula (14), the channel state information items $h_{3,1}^{(t,n)}$, $h_{3,2}^{(t,n)}$, $h_{3,3}^{(t,n)}$, and $h_{3,4}^{(t,n)}$ relating to the third transmission antenna ($m_T=3$) are collectively contained in conversion input data D. For Formula (15), the channel state information items $h_{4,1}^{(t,n)}$, $h_{4,2}^{(t,n)}$, $h_{4,3}^{(t,n)}$, and $h_{4,4}^{(t,n)}$ relating to the fourth transmission antenna ($m_T=4$) are collectively contained in conversion input data D.

In the MIMO receiver 2, arrangement of the reception antennas is fixed. Therefore, it can be determined in advance which interval between any two reception antennas is smaller than or equal to a predetermined value. Accordingly, in the third specific example, a fixed criterion for generating the conversion input data D is provided in advance to the conversion input data generator 72.

While preferred embodiments of the present invention have been described and illustrated above, it should be understood that these are exemplary embodiments of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

For example, the wireless communication system relating to the present invention may employ a multi-carrier transmission system or a single-carrier transmission system. In addition, the present invention can also be applied to a wireless communication system other than the MIMO system, so as to compress channel state information which indicates a state of the relevant communication channel.

A program for executing the functions of the channel state information compressing unit 24 shown in FIG. 2 may be stored in a computer readable storage medium, and the program stored in the storage medium may be loaded and executed on a computer system, so as to perform the channel state information compressing operation. Here, the computer system may have hardware resources which include an OS and peripheral devices.

The above computer readable storage medium is a storage device, for example, a portable medium such as a flexible disk, a magneto optical disk, a ROM, a writable and nonvolatile memory (e.g., flash memory), or a DVD (digital versatile disk), or a memory device such as a hard disk built in a computer system.

The computer readable storage medium also includes a device for temporarily storing the program, such as a volatile storage medium (e.g., DRAM (dynamic random access memory)) in a computer system which functions as a server or client and receives the program via a network (e.g., the Internet) or a communication line (e.g., a telephone line).

The above program, stored in a memory device of a computer system, may be transmitted via a transmission medium or by using transmitted waves passing through a transmission medium to another computer system. The transmission medium for transmitting the program has a function of transmitting data, and is, for example, a (communication) network such as the Internet or a communication line such as (e.g., a telephone line).

In addition, the program may execute a part of the above-explained functions.

The program may also be a "differential" program so that the above-described functions can be executed by a combination program of the differential program and an existing program which has already been stored in the relevant computer system.

What is claimed is:

1. A receiver that receives a signal from a transmitter via a plurality of communication channels, informs the transmitter of channel state information which indicates a state of the communication channels, and comprises:
   a channel correlation value computation unit that computes a correlation value assigned to each channel state information combination between channel state information items corresponding to the communication channels;
   a conversion input data generation unit that determines a channel state information combination, which has been determined to have a relatively large correlation based on the correlation value, to be conversion input data;
   a time-to-frequency region conversion unit that converts the region of the conversion input data from a time region to a frequency region;
   an information compressing unit that compresses information of a frequency component included in the conversion input data obtained by the time-to-frequency region conversion unit; and
   a transmitting unit that sends the transmitter, information-compressed data obtained by the information compressing unit and information used for isolating the channel state information items included in the conversion input data.

2. The receiver in accordance with claim 1, wherein:
   the receiver employs a multi-carrier transmission system; and
   the conversion input data generation unit generates the conversion input data by collecting channel state infatuation combinations which are determined to have a relatively large correlation and have the same subcarrier.

3. The receiver in accordance with claim 1, wherein:
   the receiver employs a multi-carrier transmission system; and
   the conversion input data generation unit generates the conversion input data by collecting channel state information combinations which are determined to have a relatively large correlation and have the same communication channel.

4. The receiver in accordance with claim 1, wherein:
   the receiver employs a multiple input multiple output (MIMO) system;
   the channel correlation value computation unit computes the correlation value for only each combination with respect to a specific transmission antenna of the transmitter, between a channel state information item of a communication channel with a specific reception antenna and a channel state information item of a communication channel with each reception antenna other than the specific reception antenna; and
   if the conversion input data generation unit determines that correlation between the relevant communication channels is relatively large, the conversion input data generation unit collects the channel state information items, which relate to the specific transmission antenna of the transmitter, to be the conversion input data.

5. A receiver that employs a multiple input multiple output (MIMO) system, receives a signal from a transmitter via a plurality of communication channels, informs the transmitter of channel state information which indicates a state of the communication channels, and comprises:
   a conversion input data generation unit that generates, for a reception antenna combination including reception antennas arranged at intervals which are smaller than or equal to a predetermined value, conversion input data which collectively includes channel state information items with one transmission antenna of the transmitter;
   a time-to-frequency region conversion unit that converts the region of the conversion input data from a time region to a frequency region;
   an information compressing unit that compresses information of a frequency component included in the conversion input data obtained by the time-to-frequency region conversion unit; and
   a transmitting unit that sends the transmitter, information-compressed data obtained by the information compressing unit and information used for isolating the channel state information items included in the conversion input data.

6. A channel state information compressing method used in a communication system that sends a signal from a transmitter to a receiver via a plurality of communication channels, so as to compress channel state information, which indicates a state of the communication channels, when sending the channel state information to the transmitter, the method comprising:
   a channel correlation value computation step that computes a correlation value assigned to each channel state information combination between channel state information items corresponding to the communication channels;
   a conversion input data generation step that determines a channel state information combination, which has been determined to have a relatively large correlation based on the correlation value, to be conversion input data;
   a time-to-frequency region conversion step that converts the region of the conversion input data from a time region to a frequency region;
   an information compressing step that compresses information of a frequency component included in the conversion input data obtained by the time-to-frequency region conversion step; and
   a transmitting step that sends the transmitter, information-compressed data obtained by the information compressing step and information used for isolating the channel state information items included in the conversion input data.

7. A channel state information compressing method used in a wireless communication system that employs a multiple input multiple output (MIMO) system and sends a signal from a transmitter to a receiver via a plurality of communication channels, so as to compress channel state information, which indicates a state of the communication channels, when sending the channel state information to the transmitter, the method comprising:
- a conversion input data generation step that generates, for a reception antenna combination including reception antennas arranged at intervals which are smaller than or equal to a predetermined value, conversion input data which collectively includes channel state information items with one transmission antenna of the transmitter;
- a time-to-frequency region conversion step that converts the region of the conversion input data from a time region to a frequency region;
- an information compressing step that compresses information of a frequency component included in the conversion input data obtained by the time-to-frequency region conversion step; and
- a transmitting step that sends the transmitter, information-compressed data obtained by the information compressing step and information used for isolating the channel state information items included in the conversion input data.

8. A non-transitory computer-readable recording medium which stores a computer program used for executing a channel state information compressing operation in a communication system that sends a signal from a transmitter to a receiver via a plurality of communication channels, wherein when sending channel state information, which indicates a state of the communication channels, to the transmitter, the computer program makes a computer execute:
- a channel correlation value computation step that computes a correlation value assigned to each channel state information combination between channel state information items corresponding to the communication channels;
- a conversion input data generation step that determines a channel state information combination, which has been determined to have a relatively large correlation based on the correlation value, to be conversion input data;
- a time-to-frequency region conversion step that converts the region of the conversion input data from a time region to a frequency region;
- an information compressing step that compresses information of a frequency component included in the conversion input data obtained by the time-to-frequency region conversion step; and
- a transmitting step that sends the transmitter, information-compressed data obtained by the information compressing step and information used for isolating the channel state information items included in the conversion input data.

9. A non-transitory computer-readable recording medium which stores a computer program used for executing a channel state information compressing operation in a wireless communication system that employs a multiple input multiple output (MIMO) system and sends a signal from a transmitter to a receiver via a plurality of communication channels, wherein when sending channel state information, which indicates a state of the communication channels, to the transmitter, the computer program makes a computer execute:
- a conversion input data generation step that generates, for a reception antenna combination including reception antennas arranged at intervals which are smaller than or equal to a predetermined value, conversion input data which collectively includes channel state information items with one transmission antenna of the transmitter;
- a time-to-frequency region conversion step that converts the region of the conversion input data from a time region to a frequency region;
- an information compressing step that compresses information of a frequency component included in the conversion input data obtained by the time-to-frequency region conversion step; and
- a transmitting step that sends the transmitter, information-compressed data obtained by the information compressing step and information used for isolating the channel state information items included in the conversion input data.

* * * * *